(12) United States Patent
Chen

(10) Patent No.: US 12,295,001 B2
(45) Date of Patent: May 6, 2025

(54) INFORMATION INDICATING METHOD, INDICATION RECEIVING METHOD, TERMINAL, AND NETWORK-SIDE DEVICE

(71) Applicant: VIVO MOBILE COMMUNICATION CO., LTD., Guangdong (CN)

(72) Inventor: Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 622 days.

(21) Appl. No.: 17/214,873

(22) Filed: Mar. 28, 2021

(65) Prior Publication Data

US 2021/0219325 A1 Jul. 15, 2021

Related U.S. Application Data

(63) Continuation of application No. PCT/CN2019/104347, filed on Sep. 4, 2019.

(30) Foreign Application Priority Data

Sep. 28, 2018 (CN) .......................... 201811141568.X

(51) Int. Cl.
*H04W 72/21* (2023.01)
*H04W 8/24* (2009.01)
*H04W 72/51* (2023.01)

(52) U.S. Cl.
CPC ........... *H04W 72/21* (2023.01); *H04W 8/245* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2015/0304838 A1* | 10/2015 | Kanamarlapudi | ...... H04W 8/24 |
| | | | 455/422.1 |
| 2015/0351092 A1* | 12/2015 | Seo | ........ H04W 72/21 |
| | | | 370/329 |
| 2016/0338138 A1 | 11/2016 | Pelletier et al. | |
| 2018/0083688 A1 | 3/2018 | Agiwal et al. | |
| 2018/0279262 A1 | 9/2018 | Babai et al. | |
| 2019/0215220 A1* | 7/2019 | Islam | .................. H04W 74/085 |

(Continued)

FOREIGN PATENT DOCUMENTS

| | | |
|---|---|---|
| CN | 1529437 A | 9/2004 |
| CN | 1241346 C | 2/2006 |
| CN | 107645778 A | 1/2018 |

(Continued)

OTHER PUBLICATIONS

International Search Report and Written Opinion of the International Searching Authority regarding International Patent Application No. PCT/CN2019/104347, dated Nov. 27, 2019. Translation provided by Bohui Intellectual Property.

(Continued)

*Primary Examiner* — Walter J Divito
(74) *Attorney, Agent, or Firm* — Harness, Dickey & Pierce, P.L.C.

(57) ABSTRACT

An information indicating method includes: sending indication information to a network-side device, where the indication information is used to indicate that a processing capability of the terminal for a target message is limited.

18 Claims, 4 Drawing Sheets

(56) References Cited

U.S. PATENT DOCUMENTS

2020/0022112 A1\* 1/2020 Yasukawa ............. H04W 72/21
2020/0396663 A1\* 12/2020 Byun .................... H04W 36/08

FOREIGN PATENT DOCUMENTS

| CN | 109215978 A | 1/2019 |
|---|---|---|
| EP | 3007514 A2 | 4/2016 |
| WO | WO-2017170223 A1 | 10/2017 |

OTHER PUBLICATIONS

First Office Action regarding Chinese Patent Application No. 201811141568.X, dated Sep. 3, 2020. Translation provided by Bohui Intellectual Property.
Supplementary European Search Report for Application No. 19865137. 4-1215 / 3860023—PCT/CN2019/104347, dated Nov. 12, 2021.
"RRC Message Size Evaluation on CSI-MeasConfig," Mediatek Inc., 3GPP TSG-RAN, WG2 Meeting #103, R2-1811335, dated Aug. 24, 2018.
First Office Action regarding European Patent Application No. 19865137.4, dated Dec. 21, 2023.
First Office Action regarding Korean Patent Application No., 10-2021-7012599, dated Apr. 15, 2024. Translation provided by Bohui Intellectual Property.

\* cited by examiner

INFORMATION INDICATING METHOD, INDICATION RECEIVING METHOD, TERMINAL, AND NETWORK-SIDE DEVICE

CROSS-REFERENCE TO RELATED APPLICATIONS

This application is a Bypass Continuation Application of PCT/CN2019/104347 filed on Sep. 4, 2019, which claims priority to Chinese Patent Application No. 201811141568.X filed on Sep. 28, 2018, which are incorporated herein by reference in their entirety.

TECHNICAL FIELD

This disclosure relates to the field of communications technologies, and in particular, to an information indicating method, an indication receiving method, a terminal, and a network-side device.

BACKGROUND

When a terminal UE is in a connected state, a network needs to configure various dedicated messages regarding, for example, measurement, handover, and random access for a user by using radio resource control (Radio Resource Control, RRC) messages. In a new radio (New Radio, NR) system, due to introduction of a multi-beam technology, different reference signals may be classified based on bandwidth sizes and different signal properties. Such reference signals, for example, synchronization signal block SSB and channel state information reference signal CSI-RS, will amount up to 128.

Therefore, an RRC message in the NR system may become very large in certain configurations. In terminal product implementation, a buffer (buffer) for receiving an RRC message is of a fixed size, and the size of the buffer is possibly limited in order to reduce costs.

SUMMARY

An embodiment of this disclosure provides an information indicating method applied to a terminal. The method includes:
  sending indication information to a network-side device, where the indication information is used to indicate that a processing capability of the terminal for a target message is limited, where
  the target message is a radio resource control RRC message, a packet data convergence protocol PDCP layer message, a radio link control protocol RLC layer message, or a media access control MAC layer message.

An embodiment of this disclosure further provides an indication receiving method, applied to a network-side device and including:
  receiving indication information sent by a terminal, where the indication information is used to indicate that a processing capability of the terminal for a target message is limited, where
  the target message is a radio resource control RRC message, a packet data convergence protocol PDCP layer message, a radio link control protocol RLC layer message, or a media access control MAC layer message.

An embodiment of this disclosure further provides a terminal, including:
  a sending module, configured to send indication information to a network-side device, where the indication information is used to indicate that a processing capability of the terminal for a target message is limited, where
  the target message is a radio resource control RRC message, a packet data convergence protocol PDCP layer message, a radio link control protocol RLC layer message, or a media access control MAC layer message.

An embodiment of this disclosure further provides a terminal, including a processor, a memory, and a computer program stored in the memory and executable on the processor, where when the computer program is executed by the processor, the steps of the foregoing information indicating method are implemented.

An embodiment of this disclosure further provides a non-transitory computer-readable storage medium, where the non-transitory computer-readable storage medium stores a computer program, and when the computer program is executed by a processor, the steps of the foregoing information indicating method are implemented.

An embodiment of this disclosure further provides a network-side device, including:
  an information receiving module, configured to receive indication information sent by a terminal, where the indication information is used to indicate that a processing capability of the terminal for a target message is limited, where
  the target message is a radio resource control RRC message, a packet data convergence protocol PDCP layer message, a radio link control protocol RLC layer message, or a media access control MAC layer message.

An embodiment of this disclosure further provides a network-side device, including a processor, a memory, and a computer program stored in the memory and executable on the processor, where when the computer program is executed by the processor, the steps of the foregoing indication receiving method are implemented.

An embodiment of this disclosure further provides a non-transitory computer-readable storage medium, where the non-transitory computer-readable storage medium stores a computer program, and when the computer program is executed by a processor, the steps of the foregoing indication receiving method are implemented.

BRIEF DESCRIPTION OF DRAWINGS

To describe the technical solutions in the embodiments of this disclosure more clearly, the following briefly describes the accompanying drawings required for describing the embodiments of this disclosure. The accompanying drawings in the following description show merely some embodiments of this disclosure, and a person of ordinary skill in the art may still derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains based on the embodiments of this disclosure shall fall within the protection scope of this disclosure.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner. The expression "A and/or B" includes the following combinations: only A, only B, and a combination of A and B.

For the buffer limitation, the following schemes may be used.

Scheme 1: Limiting the overall size of an RRC message configured for a terminal.

Scheme 2: Limiting the size of each message or those of several major RRC message configurations determining the RRC size; or limiting the quantity of reference signals in an RRC message configuration.

In a word, the foregoing schemes are both to limit, on a network side, the size of the RRC message configured for the terminal, regardless of whether the size is an overall size or sizes of individual RRC messages, while differences between terminals such as sizes of processing buffers of the terminals and latencies of the terminals are not considered. For a terminal with a large RRC buffer, or for a terminal that processes RRC message blocks, it may not be necessary to limit the size of the RRC message configured by the network for the terminal. If the network side limits the size of the RRC message configured for the terminal, a latency of the terminal in receiving the RRC message is increased, and terminal performance is affected.

Figure 1:
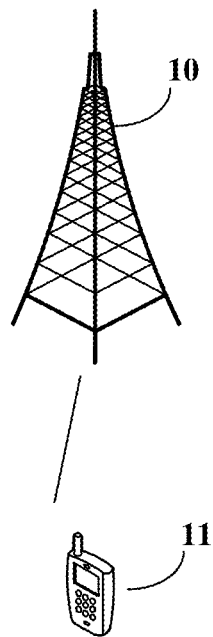
FIG. 1 presents a schematic architectural diagram of a wireless communications system according to an embodiment of this disclosure.

The following describes the embodiments of this disclosure with reference to the accompanying drawings. An information indicating method, an indication receiving method, a terminal, and a network-side device provided by the embodiments of this disclosure may be applied to a wireless communications system. The wireless communications system may be a 5G system, or an evolved long term evolution (Evolved Long Term Evolution, eLTE) system, or a later evolved communications system. FIG. 1 is a schematic architectural diagram of a wireless communications system according to an embodiment of this disclosure. As shown in FIG. 1, the wireless communications system may include a network-side device 10 and a terminal (the terminal may also be referred to as user-side equipment). For example, the terminal is marked as UE 11, and the UE 11 may be connected to the network-side device 10. In an actual application, a connection between the foregoing devices may be a wireless connection. To conveniently and visually represent a connection relationship between the devices, a solid line is used in FIG. 1.

It should be noted that the foregoing communications system may include a plurality of UEs, and the network-side device may perform communication (signaling transmission or data transmission) with the plurality of UEs.

The network-side device 10 provided by this embodiment of this disclosure may be a base station, and the base station may be a generally used base station, or may be an evolved base station (evolved node base station, eNB), or may be a device such as a network-side device (for example, a next generation base station (next generation node base station, gNB) or a transmission and reception point (transmission and reception point, TRP)) or a cell in a 5G system.

The terminal provided by this embodiment of this disclosure may be a mobile phone, a tablet computer, a notebook computer, an ultra-mobile personal computer (Ultra-Mobile Personal Computer, UMPC), a netbook, a wearable device (Wearable Device), an in-vehicle device, a personal digital assistant (Personal Digital Assistant, PDA), or the like. It should be noted that a specific type of the terminal is not limited in this embodiment of this disclosure.

Figure 2:
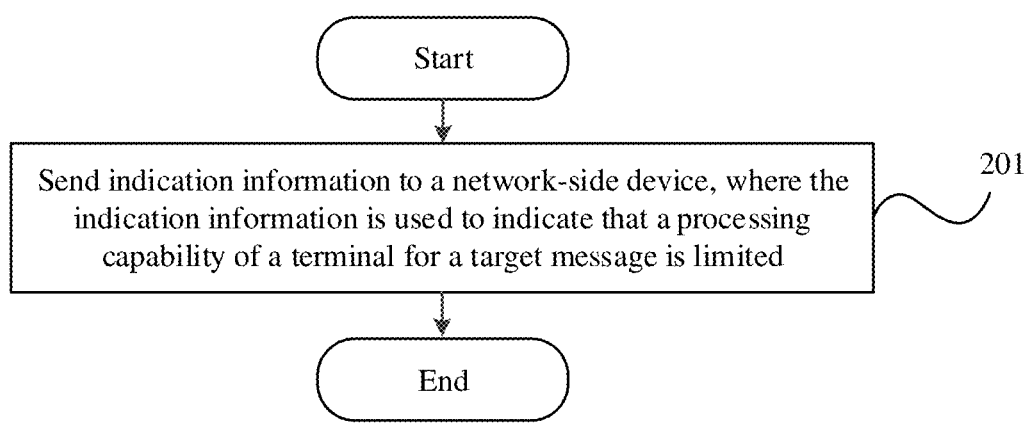
FIG. 2 presents a schematic flowchart of steps of an information indicating method according to an embodiment of this disclosure.

As shown in FIG. 2, an embodiment of this disclosure provides an information indicating method. The method is applied to a terminal and includes:

Step 201: Send indication information to a network-side device, where the indication information is used to indicate that a processing capability of the terminal for a target message is limited.

The target message is a radio resource control RRC message, a packet data convergence protocol PDCP layer message, a radio link control protocol RLC layer message, or a media access control MAC layer message.

Optionally, the indication information indicates, by indicating that a buffer size of the terminal for receiving the target message is limited, that the processing capability of the terminal for the target message is limited; or
  the indication information indicates, by indicating that a size of a service data unit SDU or a size of a protocol data unit PDU in a layer in which the target message is located is limited, that the processing capability of the terminal for the target message is limited, where
  the layer in which the target message is located is an RRC layer, a PDCP layer, an RLC layer, or a MAC layer.

Further, in an optional embodiment, in a case in which the indication information indicates, by indicating that the buffer size of the terminal for receiving the target message is limited, that the processing capability of the terminal for the target message is limited, the indication information includes at least one of the following indications:
  an indication that a size of the target message exceeds a maximum threshold or a preset threshold;
  an indication that a buffer size for the target message is greater than or equal to a first preset critical value;
  an indication that a size of a prescribed target message is greater than or equal to a second preset critical value;
  an indication that a size of a corresponding target message in a layer 1 configuration is greater than or equal to a third preset critical value;

an indication that a size of a corresponding target message in a layer 2 configuration is greater than or equal to a fourth preset critical value;

an indication about a buffer size for a configuration message on a control plane or a user plane of the terminal;

an indication about a size of a buffer of the terminal for receiving the target message;

an indication about a remaining size of a buffer of the terminal for receiving the target message; and optional configuration information, where the optional configuration information includes an identifier of an optional reference signal and/or a quantity of optional reference signals included in the target message.

Optionally, in the foregoing embodiment of this disclosure, step 201 includes:

in a case in which a preset condition is satisfied, sending the indication information to the network-side device, where the preset condition includes at least one of the following conditions:

a size of the target message exceeds a maximum threshold or a preset threshold;

a buffer size for the target message is greater than or equal to a first preset critical value;

a size of a prescribed target message is greater than or equal to a second preset critical value;

a size of a corresponding target message in a layer 1 configuration is greater than or equal to a third preset critical value;

a size of a corresponding target message in a layer 2 configuration is greater than or equal to a fourth preset critical value;

a buffer size for a configuration message on a control plane or a user plane of the terminal is greater than or equal to a fifth preset critical value;

a size of a buffer of the terminal for receiving the target message is greater than or equal to a sixth preset critical value;

a remaining size of a buffer of the terminal for receiving the target message is greater than or equal to a seventh preset critical value;

the terminal receives the target message, or the terminal receives a predetermined target message; and a quantity of reference signals included in the target message or a predetermined target message received by the terminal is greater than a preset quantity.

It should be noted that the prescribed target message may include one target message, or may include a plurality of target messages. A quantity of prescribed target messages is not limited herein. For example, the prescribed target message may be random access configuration RACH-ConfigDedicated, measurement configuration measObjectNR and/or CSI-RS measurement configuration CSI-MeasConfig.

The corresponding target message in the layer 1 configuration may be one target message, or may be a plurality of target messages. Likewise, the corresponding target message in the layer 2 configuration may be one target message, or may be a plurality of target messages. A quantity of target messages in the layer 1 configuration or a quantity of target messages in the layer 2 configuration is not limited herein.

Further, before step 201 in the foregoing embodiment of this disclosure, the method includes:

receiving a query message that is sent by the network-side device and used to query the processing capability of the terminal for the target message; and correspondingly, step 201 includes:

sending the indication information to the network-side device based on the query message.

In summary, in the foregoing embodiment of this disclosure, the terminal may actively send the indication information to the network-side device when the preset condition is satisfied, or may send the indication information to the corresponding network-side device after receiving query message sent by the network-side device.

Optionally, in the foregoing embodiment of this disclosure, step 201 includes:

sending a dedicated RRC message carrying the indication information to the network-side device; or sending a new RRC message carrying the indication information to the network-side device; or sending the indication information on a dedicated channel to the network-side device; or sending a physical uplink control channel PUCCH to the network-side device, where uplink control information UCI corresponding to the PUCCH carries the indication information, and the indication information may occupy a plurality of bits of the UCI.

The dedicated RRC message is, for example, terminal assistant information UE AssistantInfo, terminal temporary capability UE temporary capability, or terminal capability reporting UE capability.

The new RRC message may be a new RRC message prescribed between the terminal and a base station and used to carry the indication information. Because the indication information is not reported by a terminal to a network-side device in the related art, no RRC message carrying the indication information is defined in the related art. Therefore, in this embodiment of this disclosure, different from related RRC messages, an RRC message carrying the indication information is referred to as a new RRC message.

The dedicated channel may be a new channel and the PUCCH or the like agreed between the terminal and the base station for carrying the indication information.

Further, in the foregoing embodiment of this disclosure, before step 201, the method further includes:

receiving enable/disable indication information (enable/disable) sent by the network-side device, where the enable/disable indication information is used to indicate whether the terminal is enabled to report the indication information; for example, enable is used to indicate that the terminal is enabled to report the indication information, and disable is used to indicate that the terminal is not enabled to report the indication information.

Correspondingly, step 201 includes:

in a case in which the enable/disable indication information indicates that the terminal is enabled to report the indication information, sending the indication information to the network-side device.

In a case in which the enable/disable indication information indicates that the terminal is not enabled to report the indication information, regardless of whether the terminal satisfies the preset condition or receives the query message, the terminal cannot send the indication information to the network-side device.

In an optional embodiment, after step 201, the method further includes:

after a preset time or within a preset time, listening for a target message or a prescribed target message sent by the network-side device.

For example, whether the terminal listens for the target message after the preset time or listens for the target message within the preset time may be determined depending on when the network-side device limits the target message based on the indication information reported by the terminal. This is not specifically limited herein.

In summary, in the foregoing embodiment of this disclosure, the terminal reports, to the network-side device, the indication information used to indicate that the processing capability of the terminal for the target message is limited; therefore, when limiting the target message, the network-side device can consider differences between terminals based on indication information sent by each terminal, and performance of processing the target message by the terminal is improved.

Figure 3:
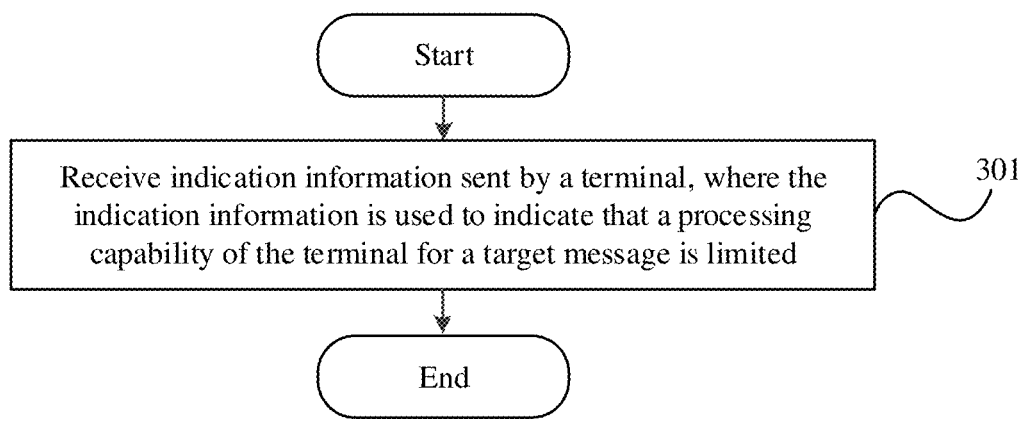
FIG. 3 presents a schematic flowchart of steps of an indication receiving method according to an embodiment of this disclosure.

As shown in FIG. 3, an embodiment of this disclosure further provides an indication receiving method. The method is applied to a network-side device and includes:

Step 301: Receive indication information sent by a terminal, where the indication information is used to indicate that a processing capability of the terminal for a target message is limited.

The target message is a radio resource control RRC message, a packet data convergence protocol PDCP layer message, a radio link control protocol RLC layer message, or a media access control MAC layer message.

Optionally, the indication information indicates, by indicating that a buffer size of the terminal for receiving the target message is limited, that the processing capability of the terminal for the target message is limited; or the indication information indicates, by indicating that a size of a service data unit SDU or a size of a protocol data unit PDU in a layer in which the target message is located is limited, that the processing capability of the terminal for the target message is limited, where the layer in which the target message is located is an RRC layer, a PDCP layer, an RLC layer, or a MAC layer.

Further, in an optional embodiment, in a case in which the indication information indicates, by indicating that the buffer size of the terminal for receiving the target message is limited, that the processing capability of the terminal for the target message is limited, the indication information includes at least one of the following indications:

an indication that a size of the target message exceeds a maximum threshold or a preset threshold;
an indication that a buffer size for the target message is greater than or equal to a first preset critical value;
an indication that a size of a prescribed target message is greater than or equal to a second preset critical value;
an indication that a size of a corresponding target message in a layer 1 configuration is greater than or equal to a third preset critical value;
an indication that a size of a corresponding target message in a layer 2 configuration is greater than or equal to a fourth preset critical value;
an indication about a buffer size for a configuration message on a control plane or a user plane of the terminal;
an indication about a size of a buffer of the terminal for receiving the target message;
an indication about a remaining size of a buffer of the terminal for receiving the target message; and
optional configuration information, where the optional configuration information includes an identifier of an optional reference signal and/or a quantity of optional reference signals included in the target message.

Optionally, in the foregoing embodiment of this disclosure, step 301 includes:

receiving the indication information sent by the terminal in a case in which a preset condition is satisfied, where the preset condition includes at least one of the following conditions:

a size of the target message exceeds a maximum threshold or a preset threshold;
a buffer size for the target message is greater than or equal to a first preset critical value;
a size of a prescribed target message is greater than or equal to a second preset critical value;
a size of a corresponding target message in a layer 1 configuration is greater than or equal to a third preset critical value;
a size of a corresponding target message in a layer 2 configuration is greater than or equal to a fourth preset critical value;
a buffer size for a configuration message on a control plane or a user plane of the terminal is greater than or equal to a fifth preset critical value;
a size of a buffer of the terminal for receiving the target message is greater than or equal to a sixth preset critical value;
a remaining size of a buffer of the terminal for receiving the target message is greater than or equal to a seventh preset critical value;
the terminal receives the target message, or the terminal receives a predetermined target message; and
a quantity of reference signals included in the target message or a predetermined target message received by the terminal is greater than a preset quantity.

It should be noted that the prescribed target message may include one target message, or may include a plurality of target messages. A quantity of prescribed target messages is not limited herein. For example, the prescribed target message may be random access configuration RACH-ConfigDedicated, measurement configuration measObjectNR and/or CSI-RS measurement configuration CSI-MeasConfig.

Further, in the foregoing embodiment of this disclosure, before step 301, the method further includes:

sending, to the terminal, a query message used to query the processing capability of the terminal for the target message.

Correspondingly, step 301 includes:

receiving the indication information sent by the terminal based on the query message.

In summary, in the foregoing embodiment of this disclosure, the terminal may actively send the indication information to the network-side device when the preset condition is satisfied, or may send the indication information to the corresponding network-side device after receiving query message sent by the network-side device.

Optionally, in the foregoing embodiment of this disclosure, step 301 includes:

receiving a dedicated RRC message carrying the indication information and sent by the terminal; or
receiving a new RRC message carrying the indication information and sent by the terminal; or
receiving, on a dedicated channel, the indication information sent by the terminal; or
receiving a PUCCH sent by the terminal, where uplink control information UCI corresponding to the PUCCH carries the indication information, and the indication information may occupy a plurality of bits of the UCI.

The dedicated RRC message is, for example, terminal assistant information UE AssistantInfo, terminal temporary capability UE temporary capability, or terminal capability reporting UE capability.

Further, in the foregoing embodiment of this disclosure, before step 301, the method further includes:

sending enable/disable indication information (enable/disable) to the terminal, where the enable/disable indication information is used to indicate whether the terminal is enabled to report the indication information; for example, enable is used to indicate that the terminal is enabled to report the indication information, and disable is used to indicate that the terminal is not enabled to report the indication information.

Correspondingly, step 301 includes:

receiving the indication information sent by the terminal in a case in which the enable/disable indication information indicates that the terminal is enabled to report the indication information.

In a case in which the enable/disable indication information indicates that the terminal is not enabled to report the indication information, regardless of whether the terminal satisfies the preset condition or receives the query message, the terminal cannot send the indication information to the network-side device.

In an optional embodiment, after step 301, the method further includes at least one of the following steps:

after a preset time or within a preset time, configuring a target message or configuring a predetermined target message for the terminal;

reducing a quantity or types of reference signals included in a target message or a predetermined target message;

limiting a size of a target message configured for the terminal;

limiting a size of a preset target message configured for the terminal;

limiting a size of a corresponding target message in the layer 1 configuration;

limiting a size of a corresponding target message in the layer 2 configuration;

limiting a buffer size for a configuration message on the control plane or the user plane of the terminal; and releasing at least one preset target message.

In summary, in the foregoing embodiment of this disclosure, the terminal reports, to the network-side device, the indication information used to indicate that the processing capability of the terminal for the target message is limited; therefore, when limiting the target message, the network-side device can consider differences between terminals based on indication information sent by each terminal, and performance of processing the target message by the terminal is improved.

Figure 4:
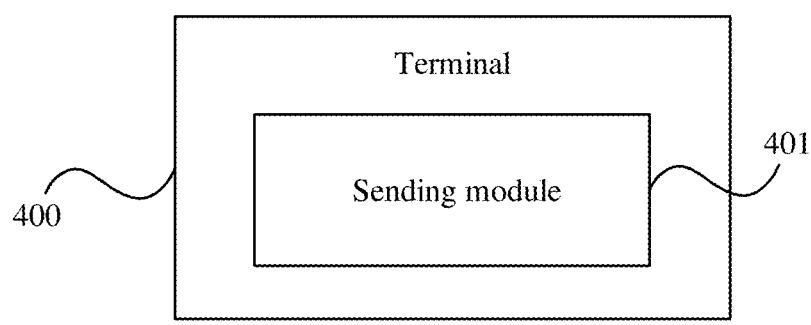
FIG. 4 presents a schematic structural diagram 1 of a terminal according to an embodiment of this disclosure.

As shown in FIG. 4, an embodiment of this disclosure further provides a terminal 400, including:

a sending module 401, configured to send indication information to a network-side device, where the indication information is used to indicate that a processing capability of the terminal for a target message is limited, where the target message is a radio resource control RRC message, a packet data convergence protocol PDCP layer message, a radio link control protocol RLC layer message, or a media access control MAC layer message.

Optionally, in the foregoing embodiment of this disclosure, the indication information indicates, by indicating that a buffer size of the terminal for receiving the target message is limited, that the processing capability of the terminal for the target message is limited; or the indication information indicates, by indicating that a size of a service data unit SDU or a size of a protocol data unit PDU in a layer in which the target message is located is limited, that the processing capability of the terminal for the target message is limited, where the layer in which the target message is located is an RRC layer, a PDCP layer, an RLC layer, or a MAC layer.

Optionally, in the foregoing embodiment of this disclosure, in a case in which the indication information indicates, by indicating that the buffer size of the terminal for receiving the target message is limited, that the processing capability of the terminal for the target message is limited, the indication information includes at least one of the following indications:

an indication that a size of the target message exceeds a maximum threshold or a preset threshold;

an indication that a buffer size for the target message is greater than or equal to a first preset critical value;

an indication that a size of a prescribed target message is greater than or equal to a second preset critical value;

an indication that a size of a corresponding target message in a layer 1 configuration is greater than or equal to a third preset critical value;

an indication that a size of a corresponding target message in a layer 2 configuration is greater than or equal to a fourth preset critical value;

an indication about a buffer size for a configuration message on a control plane or a user plane of the terminal;

an indication about a size of a buffer of the terminal for receiving the target message;

an indication about a remaining size of a buffer of the terminal for receiving the target message; and optional configuration information, where the optional configuration information includes an identifier of an optional reference signal and/or a quantity of optional reference signals included in the target message.

Optionally, in the foregoing embodiment of this disclosure, the sending module 401 includes:

a first sending submodule, configured to send the indication information to the network-side device in a case in which a preset condition is satisfied, where the preset condition includes at least one of the following conditions:

a size of the target message exceeds a maximum threshold or a preset threshold;

a buffer size for the target message is greater than or equal to a first preset critical value;

a size of a prescribed target message is greater than or equal to a second preset critical value;

a size of a corresponding target message in a layer 1 configuration is greater than or equal to a third preset critical value;

a size of a corresponding target message in a layer 2 configuration is greater than or equal to a fourth preset critical value;

a buffer size for a configuration message on a control plane or a user plane of the terminal is greater than or equal to a fifth preset critical value;

a size of a buffer of the terminal for receiving the target message is greater than or equal to a sixth preset critical value;

a remaining size of a buffer of the terminal for receiving the target message is greater than or equal to a seventh preset critical value;

the terminal receives the target message, or the terminal receives a predetermined target message; and a quantity of reference signals included in the target message or a predetermined target message received by the terminal is greater than a preset quantity.

Optionally, in the foregoing embodiment of this disclosure, the terminal further includes:

a first receiving module, configured to receive a query message that is sent by the network-side device and used to query the processing capability of the terminal for the target message, where the sending module includes:

a second sending submodule, configured to send the indication information to the network-side device based on the query message.

Optionally, in the foregoing embodiment of this disclosure, the sending module 401 includes:

a third sending submodule, configured to send a dedicated RRC message carrying the indication information to the network-side device; or configured to send a new RRC message carrying the indication information to the network-side device; or configured to send the indication information on a dedicated channel to the network-side device; or configured to send a physical uplink control channel PUCCH to the network-side device, where uplink control information UCI corresponding to the PUCCH carries the indication information.

Optionally, in the foregoing embodiment of this disclosure, the terminal further includes:

a second receiving module, configured to receive enable/disable indication information sent by the network-side device, where the enable/disable indication information is used to indicate whether the terminal is enabled to report the indication information, where the sending module includes:

a fourth sending submodule, configured to send the indication information to the network-side device in a case in which the enable/disable indication information indicates that the terminal is enabled to report the indication information.

Optionally, in the foregoing embodiment of this disclosure, the terminal further includes:

a listening module, configured to listen, after a preset time or within a preset time, for a target message or a prescribed target message sent by the network-side device.

The terminal provided by this embodiment of this disclosure can implement each process implemented by the terminal in the foregoing information indicating method embodiment. To avoid repetition, details are not described again herein.

In summary, in the foregoing embodiment of this disclosure, the terminal reports, to the network-side device, the indication information used to indicate that the processing capability of the terminal for the target message is limited; therefore, when limiting the target message, the network-side device can consider differences between terminals based on indication information sent by each terminal, and performance of processing the target message by the terminal is improved.

It should be noted that the terminal provided by this embodiment of this disclosure is a terminal capable of performing the foregoing information indicating method, and all embodiments of the foregoing information indicating method are applicable to the terminal, with the same or similar beneficial effects achieved.

Figure 5:
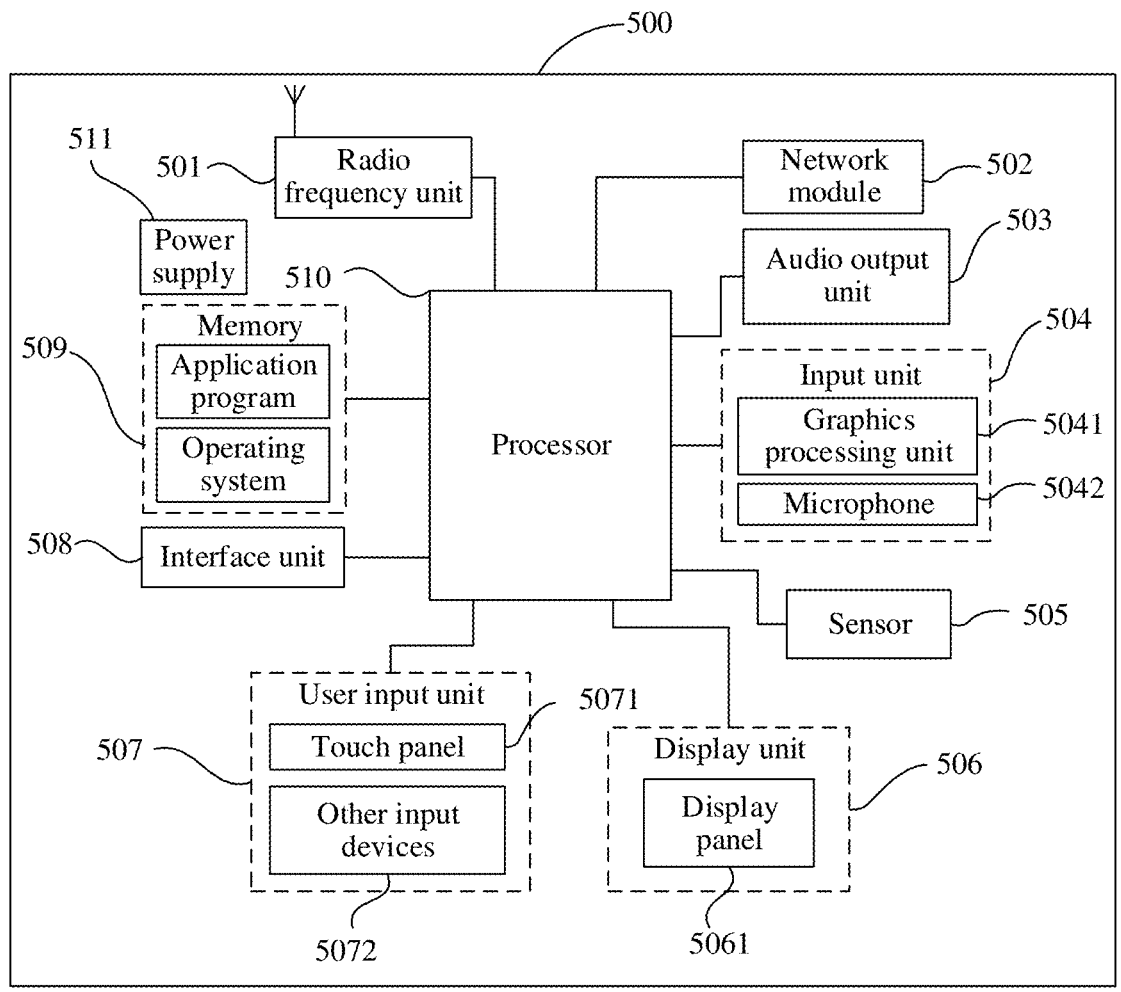
FIG. 5 presents a schematic structural diagram 2 of a terminal according to an embodiment of this disclosure.

FIG. 5 is a schematic diagram of a hardware structure of a terminal for implementing each embodiment of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 501 is configured to send indication information to a network-side device, where the indication information is used to indicate that a processing capability of the terminal for a target message is limited, where the target message is a radio resource control RRC message, a packet data convergence protocol PDCP layer message, a radio link control protocol RLC layer message, or a media access control MAC layer message.

In the foregoing embodiment of this disclosure, the terminal reports, to the network-side device, the indication information used to indicate that the processing capability of the terminal for the target message is limited; therefore, when limiting the target message, the network-side device can consider differences between terminals based on indication information sent by each terminal, and performance of processing the target message by the terminal is improved.

It should be understood that in this embodiment of this disclosure, the radio frequency unit 501 may be configured to receive and send signals in an information reception or transmission or call process. For example, after receiving downlink data from the base station, the radio frequency unit 501 sends the downlink data to the processor 510 for processing, and in addition, sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device through a wireless communications system.

The terminal provides wireless broadband Internet access for a user by using the network module 502, for example, helps the user send and receive e-mails, browse web pages, and access streaming media.

The audio output unit 503 may convert audio data received by the radio frequency unit 501 or the network module 502 or stored in the memory 509 into an audio signal, and output the audio signal as a sound. In addition, the audio output unit 503 may further provide an audio output (for example, a call signal received sound or a message received sound) related to a specific function performed by the terminal 500. The audio output unit 503 includes a speaker, a buzzer, a telephone receiver, and the like.

The input unit 504 is configured to receive an audio or video signal. The input unit 504 may include a graphics processing unit (Graphics Processing Unit, GPU) 5041 and a microphone 5042. The graphics processing unit 5041 processes image data of a still picture or a video obtained by an image capture apparatus (for example, a camera) in an image capture mode or a video capture mode. A processed image frame may be displayed on the display unit 506. An image frame processed by the graphics processing unit 5041 may be stored in the memory 509 (or another storage medium) or sent by the radio frequency unit 501 or the network module 502. The microphone 5042 can receive a sound and can process the sound into audio data. The processed audio data can be converted in a telephone call mode into a format that can be sent to a mobile communications base station through the radio frequency unit 501, for outputting.

The terminal 500 further includes at least one sensor 505, for example, an optical sensor, a motion sensor, and another sensor. For example, the optical sensor includes an ambient light sensor and a proximity sensor. The ambient light sensor may adjust luminance of a display panel 5061 based on brightness of ambient light. The proximity sensor may turn off the display panel 5061 and/or backlight when the terminal 500 moves to an ear. As a type of motion sensor, an accelerometer sensor can detect magnitudes of accelerations in all directions (usually three axes), can detect a magnitude and a direction of gravity when the mobile phone is in a stationary state, and can be applied to terminal posture recognition (such as screen switching between portrait and landscape, related games, and magnetometer posture calibration), functions related to vibration recognition (such as pedometer and tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (Liquid Crystal Display, LCD), an organic light-emitting diode (Organic Light-Emitting Diode, OLED), or the like.

The user input unit 507 may be configured to receive input digit or character information, and generate a key signal input related to a user setting and function control of the terminal. For example, the user input unit 507 includes a touch panel 5071 and other input devices 5072. The touch panel 5071, also referred to as a touchscreen, may capture a touch operation performed by the user on or near the touch panel (for example, an operation performed by the user on the touch panel 5071 or near the touch panel 5071 by using any appropriate object or accessory such as a finger or a stylus). The touch panel 5071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 510, and receives and executes a command sent by the processor 510. In addition, the touch panel 5071 may be implemented in a plurality of forms, for example, a resistive, capacitive, infrared, or surface acoustic wave touch panel. The user input unit 507 may further include the other input devices 5072 in addition to the touch panel 5071. For example, the other input devices 5072 may include but are not limited to a physical keyboard, a function key (such as a volume control key or a power on/off key), a trackball, a mouse, a joystick, and the like. Details are not described herein.

Further, the touch panel 5071 may cover the display panel 5061. After the touch panel 5071 detects a touch operation on or near the touch panel, the touch panel 5071 transmits the touch operation to the processor 510 to determine a type of a touch event. Then the processor 510 provides a corresponding visual output on the display panel 5061 based on the type of the touch event. Although the touch panel 5071 and the display panel 5061 are used as two independent components to implement input and output functions of the terminal in FIG. 5, the touch panel 5071 and the display panel 5061 may be integrated to implement the input and output functions of the terminal in some embodiments. This is not specifically limited herein.

The interface unit 508 is an interface for connecting an external apparatus to the terminal 500. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 508 may be configured to receive an input (for example, data information or power) from an external apparatus, and transmit the received input to one or more components in the terminal 500, or may be configured to transmit data between the terminal 500 and an external apparatus.

The memory 509 may be configured to store a software program and various data. The memory 509 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 509 may include a high-speed random access memory, or may include a non-volatile memory, for example, at least one magnetic disk storage device, a flash memory, or other non-volatile solid-state storage devices.

The processor 510 is a control center of the terminal. The processor 510 uses various interfaces and lines to connect all parts of the entire terminal, and performs various functions and data processing of the terminal by running or executing the software program and/or module stored in the memory 509 and invoking data stored in the memory 509, thereby performing overall monitoring on the terminal. The processor 510 may include one or more processing units. Optionally, the processor 510 may integrate an application processor and a modem processor. The application processor mainly processes the operating system, a user interface, an application program, and the like. The modem processor mainly processes wireless communication. It may be understood that the modem processor may alternatively not be integrated into the processor 510.

The terminal 500 may further include the power supply 511 (such as a battery) supplying power to each component. Optionally, the power supply 511 may be logically connected to the processor 510 by using a power management system, so that functions such as charge and discharge management and power consumption management are implemented by using the power management system.

In addition, the terminal 500 includes some functional modules that are not illustrated. Details are not described herein.

Figure 6:
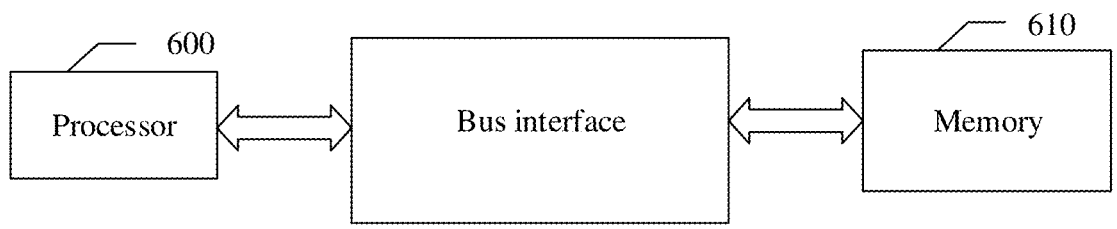
FIG. 6 presents a schematic structural diagram 3 of a terminal according to an embodiment of this disclosure.

Optionally, as shown in FIG. 6, an embodiment of this disclosure further provides a terminal, including: a processor 600, a memory 610, and a computer program stored in the memory 610 and executable on the processor 600. When the computer program is executed by the processor 600, each process of the foregoing information indicating method embodiment is implemented, with the same technical effect achieved. To avoid repetition, details are not described again herein.

An embodiment of this disclosure further provides a non-transitory computer-readable storage medium, where a computer program is stored in the non-transitory computer-readable storage medium. When the computer program is executed by a processor, each process of the foregoing information indicating method embodiment is implemented, with the same technical effect achieved. To avoid repetition, details are not described again herein. The non-transitory computer-readable storage medium is, for example, a read-only memory (Read-Only Memory, ROM), a random access memory (Random Access Memory, RAM), a magnetic disk, or an optical disc.

Figure 7:
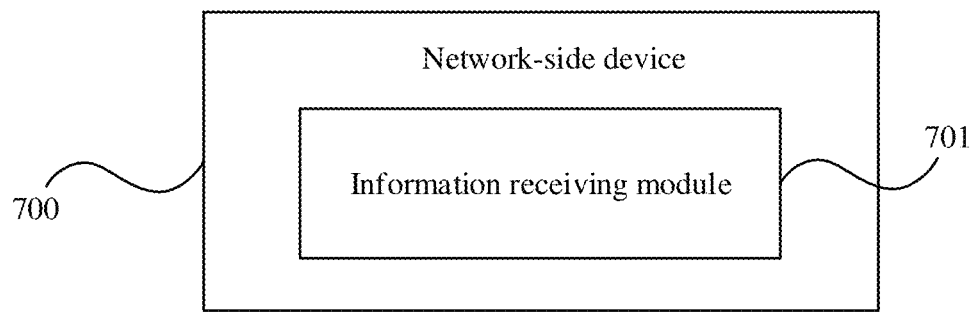
FIG. 7 presents a schematic structural diagram 1 of a network-side device according to an embodiment of this disclosure.

As shown in FIG. 7, an embodiment of this disclosure further provides a network-side device 700, including:

an information receiving module 701, configured to receive indication information sent by a terminal, where the indication information is used to indicate that a processing capability of the terminal for a target message is limited, where the target message is a radio resource control RRC message, a packet data convergence protocol PDCP layer message, a radio link control protocol RLC layer message, or a media access control MAC layer message.

Optionally, in the foregoing embodiment of this disclosure, the indication information indicates, by indicating that a buffer size of the terminal for receiving the target message is limited, that the processing capability of the terminal for the target message is limited; or the indication information indicates, by indicating that a size of a service data unit SDU or a size of a protocol data unit PDU in a layer in which the target message is located is limited, that the processing capability of the terminal for the target message is limited, where the layer in which the target message is located is an RRC layer, a PDCP layer, an RLC layer, or a MAC layer.

Optionally, in the foregoing embodiment of this disclosure, in a case in which the indication information indicates, by indicating that the buffer size of the terminal for receiving the target message is limited, that the processing capability of the terminal for the target message is limited, the indication information includes at least one of the following indications:

an indication that a size of the target message exceeds a maximum threshold or a preset threshold;
an indication that a buffer size for the target message is greater than or equal to a first preset critical value;
an indication that a size of a prescribed target message is greater than or equal to a second preset critical value;
an indication that a size of a corresponding target message in a layer 1 configuration is greater than or equal to a third preset critical value;
an indication that a size of a corresponding target message in a layer 2 configuration is greater than or equal to a fourth preset critical value;
an indication about a buffer size for a configuration message on a control plane or a user plane of the terminal;
an indication about a size of a buffer of the terminal for receiving the target message;
an indication about a remaining size of a buffer of the terminal for receiving the target message; and
optional configuration information, where the optional configuration information includes an identifier of an optional reference signal and/or a quantity of optional reference signals included in the target message.

Optionally, in the foregoing embodiment of this disclosure, the information receiving module 701 includes:

a first information receiving submodule, configured to receive the indication information sent by the terminal in a case in which a preset condition is satisfied, where the preset condition includes at least one of the following conditions:

a size of the target message exceeds a maximum threshold or a preset threshold;
a buffer size for the target message is greater than or equal to a first preset critical value;
a size of a prescribed target message is greater than or equal to a second preset critical value;
a size of a corresponding target message in a layer 1 configuration is greater than or equal to a third preset critical value;
a size of a corresponding target message in a layer 2 configuration is greater than or equal to a fourth preset critical value;
a buffer size for a configuration message on a control plane or a user plane of the terminal is greater than or equal to a fifth preset critical value;
a size of a buffer of the terminal for receiving the target message is greater than or equal to a sixth preset critical value;
a remaining size of a buffer of the terminal for receiving the target message is greater than or equal to a seventh preset critical value;
the terminal receives the target message, or the terminal receives a predetermined target message; and
a quantity of reference signals included in the target message or a predetermined target message received by the terminal is greater than a preset quantity.

Optionally, in the foregoing embodiment of this disclosure, the network-side device further includes:

a query sending module, configured to send, to the terminal, a query message used to query the processing capability of the terminal for the target message, where
the information receiving module 701 includes:
a second information receiving submodule, configured to receive the indication information sent by the terminal based on the query message.

Optionally, in the foregoing embodiment of this disclosure, the information receiving module 701 includes:

a third information receiving submodule, configured to receive a dedicated RRC message carrying the indication information and sent by the terminal; or configured to receive a new RRC message carrying the indication information and sent by the terminal; or configured to receive, on a dedicated channel, the indication information sent by the terminal; or configured to receive a PUCCH sent by the terminal, where uplink control information UCI corresponding to the PUCCH carries the indication information.

Optionally, in the foregoing embodiment of this disclosure, the network-side device further includes:

an enable sending module, configured to send enable/disable indication information to the terminal, where the enable/disable indication information is used to indicate whether the terminal is enabled to report the indication information, where
the information receiving module 701 includes:
a fourth information receiving submodule, configured to receive the indication information sent by the terminal in a case in which the enable/disable indication information indicates that the terminal is enabled to report the indication information.

Optionally, in the foregoing embodiment of this disclosure, the network-side device further includes:

a processing module, configured to perform at least one of the following steps:

after a preset time or within a preset time, configuring a target message or configuring a predetermined target message for the terminal;

reducing a quantity or types of reference signals included in a target message or a predetermined target message;

limiting a size of a target message configured for the terminal;

limiting a size of a preset target message configured for the terminal;

limiting a size of a corresponding target message in the layer 1 configuration;

limiting a size of a corresponding target message in the layer 2 configuration;

limiting a buffer size for a configuration message on the control plane or the user plane of the terminal; and releasing at least one preset target message.

The network-side device provided by this embodiment of this disclosure can implement each process implemented by the network-side device in the foregoing indication receiving method embodiment. To avoid repetition, details are not described again herein.

In the foregoing embodiment of this disclosure, the terminal reports, to the network-side device, the indication information used to indicate that the processing capability of the terminal for the target message is limited; therefore, when limiting the target message, the network-side device can consider differences between terminals based on indication information sent by each terminal, and performance of processing the target message by the terminal is improved.

It should be noted that the network-side device provided by this embodiment of this disclosure is a network-side device capable of performing the foregoing indication receiving method, and all embodiments of the foregoing indication receiving method are applicable to the network-side device, with the same or similar beneficial effects achieved.

Figure 8:
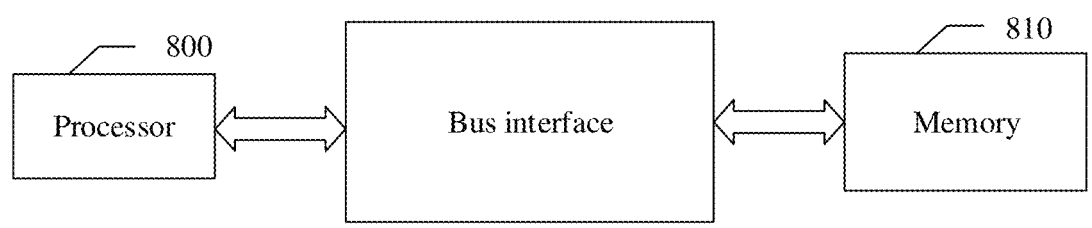
FIG. 8 presents a schematic structural diagram 2 of a network-side device according to an embodiment of this disclosure.

Optionally, as shown in FIG. 8, an embodiment of this disclosure further provides a network-side device, including: a processor 800, a memory 810, and a computer program stored in the memory 810 and executable on the processor 800. When the computer program is executed by the processor 800, each process of the foregoing indication receiving method embodiment is implemented, with the same technical effect achieved. To avoid repetition, details are not described again herein.

An embodiment of this disclosure further provides a non-transitory computer-readable storage medium, where a computer program is stored in the non-transitory computer-readable storage medium. When the computer program is executed by a processor, each process of the foregoing indication receiving method embodiment is implemented, with the same technical effect achieved. To avoid repetition, details are not described again herein. The non-transitory computer-readable storage medium is, for example, a read-only memory (Read-Only Memory, ROM), a random access memory (Random Access Memory, RAM), a magnetic disk, or an optical disc.

It should be noted that the terms "comprising", "including", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An information indicating method, applied to a terminal and comprising:

in response to determining that a quantity of reference signals comprised in a radio resource control (RRC) message or a predetermined RRC message received by the terminal is greater than a preset quantity, sending indication information to a network-side device, wherein the indication information is used to indicate a size of a buffer of the terminal for receiving the RRC message or to indicate a remaining size of a buffer of the terminal for receiving the RRC message.

2. The method according to claim 1, wherein the indication information further comprises at least one of:

an indication that a size of the RRC message exceeds a maximum threshold or a preset threshold;

an indication that the buffer size of the terminal for receiving the RRC message is greater than or equal to a first preset critical value;

an indication that a size of a prescribed RRC message is greater than or equal to a second preset critical value;

an indication that a size of a corresponding RRC message in a layer 1 configuration is greater than or equal to a third preset critical value;

an indication that a size of a corresponding RRC message in a layer 2 configuration is greater than or equal to a fourth preset critical value;
an indication about a buffer size for a configuration message on a control plane or a user plane of the terminal; or
optional configuration information, wherein the optional configuration information comprises an identifier of an optional reference signal and/or a quantity of optional reference signals comprised in the RRC message.

3. The method according to claim 1, wherein the method further comprises: in a case in which a preset condition is satisfied, sending the indication information to the network-side device, and the preset condition comprises at least one of:
a size of the RRC message exceeds a maximum threshold or a preset threshold;
a buffer size for the RRC message is greater than or equal to a first preset critical value;
a size of a prescribed RRC message is greater than or equal to a second preset critical value;
a size of a corresponding RRC message in a layer 1 configuration is greater than or equal to a third preset critical value;
a size of a corresponding RRC message in a layer 2 configuration is greater than or equal to a fourth preset critical value;
a buffer size for a configuration message on a control plane or a user plane of the terminal is greater than or equal to a fifth preset critical value;
the size of the buffer of the terminal for receiving the RRC message is greater than or equal to a sixth preset critical value;
the remaining size of the buffer of the terminal for receiving the RRC message is greater than or equal to a seventh preset critical value; or
the terminal receives the RRC message, or the terminal receives a predetermined RRC message.

4. The method according to claim 1, wherein before the sending indication information to a network-side device, the method comprises:
receiving a query message that is sent by the network-side device and used to query a processing capability of the terminal for the RRC message; and
the sending indication information to a network-side device comprises:
sending the indication information to the network-side device based on the query message.

5. The method according to claim 1, wherein the sending indication information to a network-side device comprises:
sending a dedicated RRC message carrying the indication information to the network-side device; or
sending a new RRC message carrying the indication information to the network-side device; or
sending the indication information on a dedicated channel to the network-side device; or
sending a physical uplink control channel (PUCCH) to the network-side device, wherein uplink control information (UCI) corresponding to the PUCCH carries the indication information.

6. The method according to claim 1, wherein before the sending indication information to a network-side device, the method further comprises:
receiving enable/disable indication information sent by the network-side device, wherein the enable/disable indication information is used to indicate whether the terminal is enabled to report the indication information; and
the sending indication information to a network-side device comprises:
in a case in which the enable/disable indication information indicates that the terminal is enabled to report the indication information, sending the indication information to the network-side device.

7. The method according to claim 1, wherein after the sending indication information to a network-side device, the method further comprises:
after a preset time or within a preset time, listening for a RRC message or a prescribed RRC message sent by the network-side device.

8. An indication receiving method, applied to a network-side device and comprising:
receiving indication information sent by a terminal, wherein the indication information is sent by the terminal in response to determining that a quantity of reference signals comprised in a radio resource control (RRC) message or a predetermined RRC message received by the terminal is greater than a preset quantity, wherein the indication information is used to indicate a size of a buffer of the terminal for receiving the RRC message or to indicate a remaining size of a buffer of the terminal for receiving the RRC message.

9. The method according to claim 8, wherein the indication information further comprises at least one of:
an indication that a size of the RRC message exceeds a maximum threshold or a preset threshold;
an indication that the buffer size of the terminal for receiving the RRC message is greater than or equal to a first preset critical value;
an indication that a size of a prescribed RRC message is greater than or equal to a second preset critical value;
an indication that a size of a corresponding RRC message in a layer 1 configuration is greater than or equal to a third preset critical value;
an indication that a size of a corresponding RRC message in a layer 2 configuration is greater than or equal to a fourth preset critical value;
an indication about a buffer size for a configuration message on a control plane or a user plane of the terminal; or
optional configuration information, wherein the optional configuration information comprises an identifier of an optional reference signal and/or a quantity of optional reference signals comprised in the RRC message.

10. The method according to claim 9, wherein after the receiving indication information sent by a terminal, the method further comprises at least one of:
after a preset time or within a preset time, configuring a RRC message or configuring a predetermined RRC message for the terminal;
reducing a quantity or types of reference signals comprised in a RRC message or a predetermined RRC message;
limiting a size of a RRC message configured for the terminal;
limiting a size of a preset RRC message configured for the terminal;
limiting a size of a corresponding RRC message in the layer 1 configuration;
limiting a size of a corresponding RRC message in the layer 2 configuration;

limiting a buffer size for a configuration message on the control plane or the user plane of the terminal; or releasing at least one preset RRC message.

11. The method according to claim 8, wherein the method further comprises: receiving the indication information sent by the terminal in a case in which a preset condition is satisfied, and the preset condition comprises at least one of:

a size of the RRC message exceeds a maximum threshold or a preset threshold;

a buffer size for the RRC message is greater than or equal to a first preset critical value;

a size of a prescribed RRC message is greater than or equal to a second preset critical value;

a size of a corresponding RRC message in a layer 1 configuration is greater than or equal to a third preset critical value;

a size of a corresponding RRC message in a layer 2 configuration is greater than or equal to a fourth preset critical value;

a buffer size for a configuration message on a control plane or a user plane of the terminal is greater than or equal to a fifth preset critical value;

the size of the buffer of the terminal for receiving the RRC message is greater than or equal to a sixth preset critical value;

the remaining size of the buffer of the terminal for receiving the RRC message is greater than or equal to a seventh preset critical value; or the terminal receives the RRC message, or the terminal receives a predetermined RRC message.

12. The method according to claim 8, wherein before the receiving indication information sent by a terminal, the method further comprises:

sending, to the terminal, a query message used to query a processing capability of the terminal for the RRC message; and the receiving indication information sent by a terminal comprises:

receiving the indication information sent by the terminal based on the query message.

13. The method according to claim 8, wherein the receiving indication information sent by a terminal comprises:

receiving a dedicated RRC message carrying the indication information and sent by the terminal; or receiving a new RRC message carrying the indication information and sent by the terminal; or receiving, on a dedicated channel, the indication information sent by the terminal; or receiving a physical uplink control channel (PUCCH) sent by the terminal, wherein uplink control information (UCI) corresponding to the PUCCH carries the indication information.

14. The method according to claim 8, wherein before the receiving indication information sent by a terminal, the method further comprises:

sending enable/disable indication information to the terminal, wherein the enable/disable indication information is used to indicate whether the terminal is enabled to report the indication information; and the receiving indication information sent by a terminal comprises:

receiving the indication information sent by the terminal in a case in which the enable/disable indication information indicates that the terminal is enabled to report the indication information.

15. A terminal, comprising a processor, a memory, and a computer program stored in the memory and executable on the processor, wherein the computer program, when executed by the processor, causes the terminal to perform:

in response to determining that a quantity of reference signals comprised in a radio resource control (RRC) message or a predetermined RRC message received by the terminal is greater than a preset quantity, sending indication information to a network-side device, wherein the indication information is used to indicate a size of a buffer of the terminal for receiving the RRC message or to indicate a remaining size of a buffer of the terminal for receiving the RRC message.

16. A non-transitory computer-readable storage medium, wherein the non-transitory computer-readable storage medium stores a computer program, and when the computer program is executed by a processor, steps of the information indicating method according to claim 1 are implemented.

17. A network-side device, comprising a processor, a memory, and a computer program stored in the memory and executable on the processor, wherein when the computer program is executed by the processor, steps of the indication receiving method according to claim 8 are implemented.

18. A non-transitory computer-readable storage medium, wherein the non-transitory computer-readable storage medium stores a computer program, and when the computer program is executed by a processor, steps of the indication receiving method according to claim 8 are implemented.

* * * * *